UNITED STATES PATENT OFFICE.

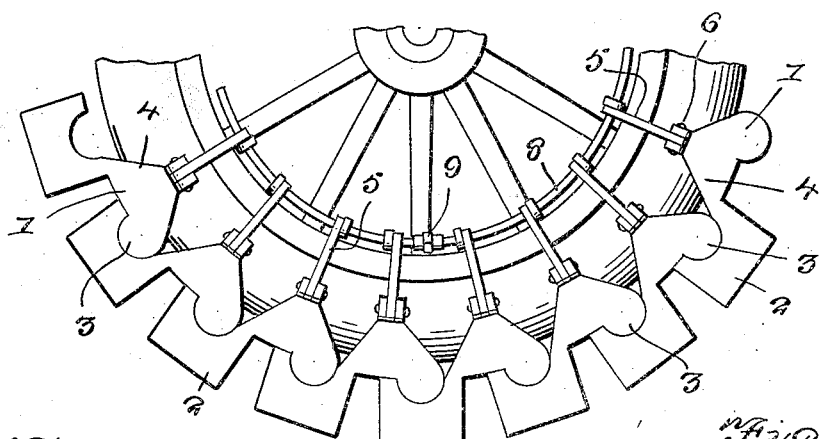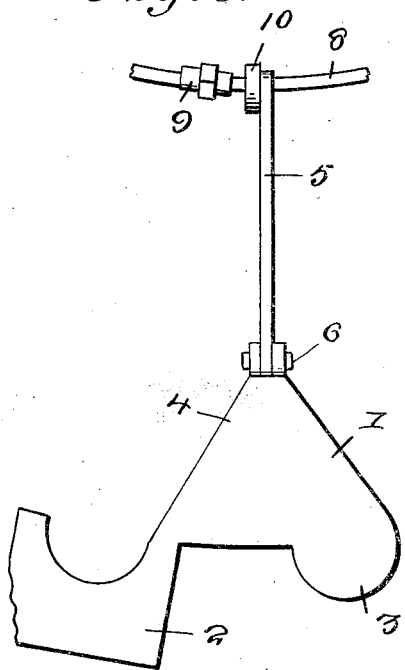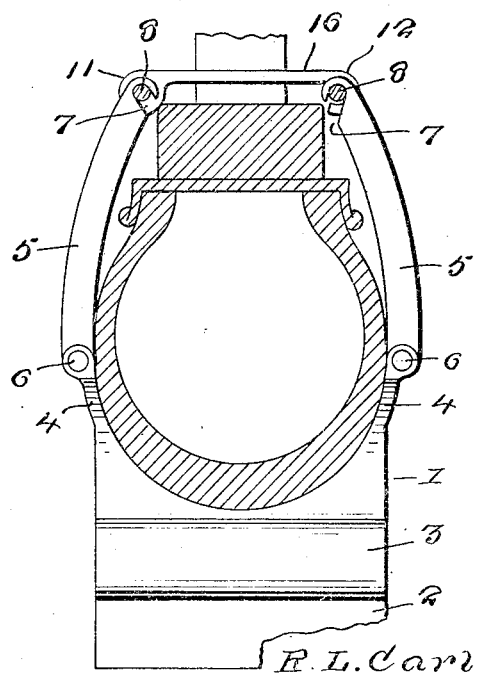

ROBERT L. CARLINE, OF PITTSBURGH, PENNSYLVANIA.

TRACTION-GRIPPING DEVICE.

1,348,697. Specification of Letters Patent. Patented Aug. 3, 1920.

Application filed March 6, 1920. Serial No. 363,749.

*To all whom it may concern:*

Be it known that I, ROBERT L. CARLINE, a citizen of the United States, residing at Pittsburgh, in the county of Allegheny and State of Pennsylvania, have invented new and useful Improvements in Traction-Gripping Devices, of which the following is a specification.

This invention relates to traction gripping devices, and more particularly to a device specially adapted for use in connection with automobiles.

One of the main objects of the invention is to provide a device of simple construction and operation which may be readily applied to an automobile wheel and which is provided with a plurality of flat traction engaging elements of comparatively great area so as to permit effective use of an automobile in soft ground for agricultural operations. A further object is to provide a device composed of a plurality of interlocking elements so connected as to permit ready removal of any one of the elements independently of the others. Further objects will appear from the detailed description.

In the drawings:—

Figure 1 is a side view of an automobile wheel showing a device constructed in accordance with my invention as applied.

Fig. 2 is an end view of one of the members of the device as applied, the tire and associated parts and the securing cables being shown in section.

Fig. 3 is an enlarged detail side view of one of the members or blocks of the device.

In constructing the device I provide a plurality of members 1 each of which is provided at one end with a block 2 the outer face of which is flat or plane and of relatively great area. At its other end member 1 is provided with a transversely extending rounded element or bead 3 which is adapted to fit snugly into a corresponding recess formed in the inner face of block 2 of the succeeding member 1. By this arrangement, the members 1 are secured in interlocking engagement and any one of these members may be readily removed by sliding the same transversely about the tire. Each of the members is further provided with lateral arms 4 which extend along the sides of the tire of the wheel, each of these arms being bifurcated at its inner end to receive the outer end of a link 5 pivotally secured therein by a pin 6. The links extend inwardly about the tire and the felly of the wheel and each link is provided in its inner end with a downwardly and inwardly inclined slot 7 which extends from the inner edge of the link. These slots receive securing cables 8 which are positioned closely adjacent to and concentric with the felly of the wheel, each of these cables being provided with turn buckles 9 for tensioning the same. A plurality of hooks 10 corresponding in number to the members 1 are mounted upon one of the cables 8 and hook over the other cable. As will be noted more clearly from Fig. 2, eye 11 of this hook is normally positioned closely adjacent to one of the links 5, and the bill 12 at the other end of the hook is positioned closely adjacent to the other link. To prevent accidental disengagement of the cables from the links when the cables are under tension and, by slacking either one of the cables slightly, the hook may be disengaged so as to permit disengagement of the links 5 of any one of the members 1, selectively, from the cables thus permitting removal of this member independently of the other members of the device. This permits ready repair of the device in the event of any of the members becoming broken or distorted.

As stated, the device is intended more particularly for use in soft ground for agricultural operations, and the flat blocks 2 which are of comparatively great area provide sufficient surface of contact to insure gripping of the traction surface to such an extent as to propel the automobile in soft ground, such as plowed ground, thus permitting it to be readily used for agricultural purposes under adverse conditions. As any of the members composing the device may be readily removed, it is possible to quickly and easily clean and repair the device when required. Also, as the members 1 may be readily formed by casting, the device as a whole may be quickly produced and assembled at comparatively small cost.

What I claim is:

1. In a device of the character described, a plurality of members adapted to fit about a tire each provided at one end with an outwardly projecting block having a transversely extending substantially semi-cylindrical recess and at its other end with a transversely extending rounded element adapted to fit into the recess of the succeeding member, and means for securing said members in assembled condition about the tire.

2. In a device of the character described, a plurality of members adapted to fit about a tire each provided at one end with an outwardly projecting block having a transversely extending substantially semi-cylindrical recess and at its other end with a transversely extending rounded element adapted to fit into the recess of the succeeding member, and means for securing said members in assembled condition about the tire, said securing means being adapted to permit removal or attachment of any one of said members independently of the other members.

3. In a device of the character described, a plurality of members adapted to fit about an automobile tire each provided at one end with an outwardly projecting block having its under face provided with a transversely extending substantially semi-cylindrical recess and at its other end with a transversely extending rounded element adapted to fit into the recess of the succeeding member, links pivoted at their outer ends to the sides of said members and provided in their inner ends with inwardly directed slots, cables disposed concentric with said members and engaging into said slots, and means for tensioning said cables.

4. In combination with an automobile wheel and a tire carried thereby, a plurality of members fitting about the tread portion of the tire, each of said members being provided at one end with a transversely extending substantially semi-cylindrical recess and at its other end with a rounded element extending transversely thereof and adapted to fit into the recess of the succeeding member, links pivoted to the sides of said members and extending inwardly about the tire and the felly of the wheel, said links being provided with inwardly directed slots in their inner ends, cables engaging into said slots, means for tensioning said cables, and hooks mounted upon one of the cables and positioned to engage over the other cable, said hooks being positioned closely adjacent to the inner ends of the links.

In testimony whereof I affix my signature.

ROBERT L. CARLINE.